United States Patent
Sumida

[11] Patent Number: 6,166,909
[45] Date of Patent: Dec. 26, 2000

[54] SWITCH BOX FOR A VEHICLE

[75] Inventor: Tatsuya Sumida, Yokkaichi, Japan

[73] Assignee: Sumitomo Wiring Systems, Ltd., Mie, Japan

[21] Appl. No.: 09/235,636

[22] Filed: Jan. 22, 1999

[30] Foreign Application Priority Data

Jan. 22, 1998 [JP] Japan .................................. 10-010182

[51] Int. Cl.$^7$ .................................................. H05K 7/20
[52] U.S. Cl. .......................... 361/704; 361/707; 361/710; 257/706; 165/80.3; 174/16.3
[58] Field of Search .................................... 361/700–707, 361/710–721, 688–692, 717–723, 734–737; 174/16.3, 252, 52.1; 165/80.3, 185, 80.2, 80.4; 257/706–727; 24/453, 457; 123/179.3, 179.2; 307/10.3, 10.5; 180/287; 290/38 R

[56] References Cited

U.S. PATENT DOCUMENTS

| | | | |
|---|---|---|---|
| 4,803,590 | 2/1989 | Fassel et al. .............................. | 361/386 |
| 5,118,903 | 6/1992 | Schupp et al. .......................... | 174/16.3 |
| 5,140,500 | 8/1992 | Klein et al. .............................. | 361/388 |
| 5,438,310 | 8/1995 | Ikari ........................................ | 337/208 |
| 5,640,304 | 6/1997 | Hellinga et al. ........................ | 361/707 |
| 5,712,765 | 1/1998 | Lehrmann et al. ..................... | 361/704 |
| 5,812,376 | 9/1998 | Mach et al. ............................. | 361/719 |
| 5,909,358 | 6/1999 | Bradt ....................................... | 361/707 |
| 6,026,773 | 2/2000 | LaBelle ................................. | 123/179.3 |

FOREIGN PATENT DOCUMENTS

U-5-78126  10/1993  Japan .
7-122867   5/1995   Japan .

Primary Examiner—Leo P. Picard
Assistant Examiner—Michael Datskovsky
Attorney, Agent, or Firm—Oliff & Berridge, PLC

[57] ABSTRACT

A switch box for a vehicle has a substrate, an electricity distribution bus bar mounted on the substrate and at least one intelligent power switch mounted on the bus bar. To provide good heat dispersal from the switch, the bus bar is mounted to be upstanding from the substrate with its side surfaces extending away from the substrate. The intelligent power switch is mounted on one side surface of the bus bar. The bus bar may be shaped so as to lie against at least two sides of the intelligent power switch.

5 Claims, 4 Drawing Sheets

SWITCH BOX FOR A VEHICLE

BACKGROUND OF THE INVENTION

1. Field of Invention

The present invention relates to a switch box. In particular, the invention relates to a switch box suitable to be installed on a vehicle such as an automobile and to a vehicle having the switch box installed in it.

2. Description of Related Art

In a vehicle such as an automobile, a switch box accommodating various kinds of functional component parts such as fuses, relays, and the like has been used. In the switch box, circuits are turned on and off by plug-in type relays, and the power supply is cut off by fuses under abnormal conditions. Because such a switch box accommodates many component parts and is large, a switch box miniaturized by using an intelligent power switch instead of the fuses and the relays has been developed. By using the intelligent power switch, the switch box is allowed to have a monitor function of generating an alarm when abnormal electric current is detected during driving of the vehicle. When the abnormality has been eliminated, the intelligent power switch returns to the original state automatically.

However, because the intelligent power switch is composed of electronic elements, it has a feature that it has a large heat output and is destroyed at high temperatures. Thus, the switch box using such an intelligent power switch is provided with heat dispersion means (see Japanese Laid-Open Patent Publications No. 5-78126 and 7-122867).

In the switch box disclosed in Japanese Laid-Open Patent Publication No. 5-78126, as shown in FIG. 3, a bus bar 31 is laid on the upper surface of a substrate 30 accommodated inside the box. Intelligent power switches 32 are installed on the bus bar 31. Heat generated by the intelligent power switches 32 can be dispersed through the bus bar 31. Because the lower surface of the bus bar 31 is laid on and in contact with the upper surface of the substrate 30, the bus bar 31 requires a large space on the substrate 30. Thus, the substrate 30 is necessarily large and hence expensive.

In the switch box disclosed in Japanese Laid-Open Patent Publication No. 7-122867, as shown in FIG. 4, a frame-shaped heat sink 34 is erected on the upper surface of a substrate 33 accommodated inside the box. Intelligent power switch 35 is installed on a side surface of the heat sink 34. Accordingly, heat generated by the intelligent power switch 35 can be dispersed through the heat sink 34. In this switch box, the heat sink 34 has merely a function of removing the heat generated by the intelligent power switch 35 and of holding the intelligent power switch 35 fixed thereto.

SUMMARY OF THE INVENTION

The present invention has been made in the light of the above-described situation. It is an object of the present invention to provide a compact substrate and reduce the cost of component parts.

According to the present invention, there is provided a switch box having a substrate, an electricity distribution bus bar mounted on the substrate, and at least one intelligent power switch mounted on the bus bar. The bus bar is mounted to be upstanding from the substrate with side surfaces of the bus bar extending away from the substrate. The intelligent power switch or switches are mounted on one of the side surfaces of the bus bar.

In order to provide good thermal contact, the bus bar is shaped to lie against at least two sides of one or each intelligent power switch.

The bus bar may have a power supply input contact tab as an integral part thereof, and also the bus bar may have a terminal portion as an integral part thereof having a plurality of terminals connectible to electrical components. To improve heat dispersal, at least one heat radiation fin may be proximate to, and in thermally conductive connection with, a portion of the bus bar on which the intelligent power switch is mounted.

The invention further provides a vehicle having mounted in it at least one switch box in accordance with the invention.

As used herein, a "bus bar" is an electricity distribution element, usually one-piece, which distributes electrical power from a power input to a plurality of electrical components or circuits. Typically the bus bar has a plurality of output terminals to which components, e.g. fuses and/or relay boxes, are connectable. As used herein, an "intelligent power switch" is a switch containing electronic devices which sense at least one electrical quantity, e.g. current passing, and controls operation of the switch accordingly.

BRIEF DESCRIPTION OF THE DRAWINGS

These and other objects, features and advantages of the present invention will become clear from the following description of the exemplary embodiments thereof with reference to the accompanying drawings throughout which like parts are designated by like reference numerals, and in which.

DETAILED DESCRIPTION OF PREFERRED EMBODIMENTS

Figure 1:
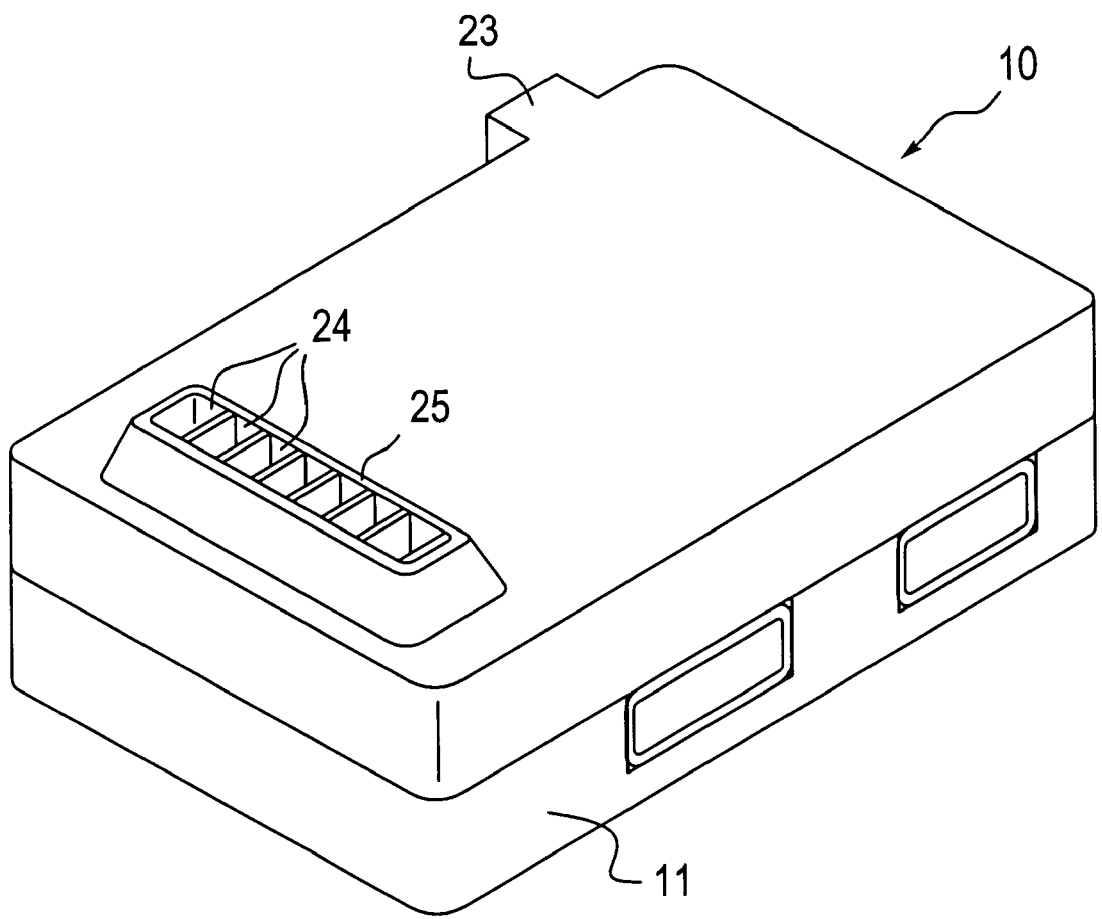
FIG. 1 is a perspective view showing a switch box of an embodiment of the present invention.
Figure 2:
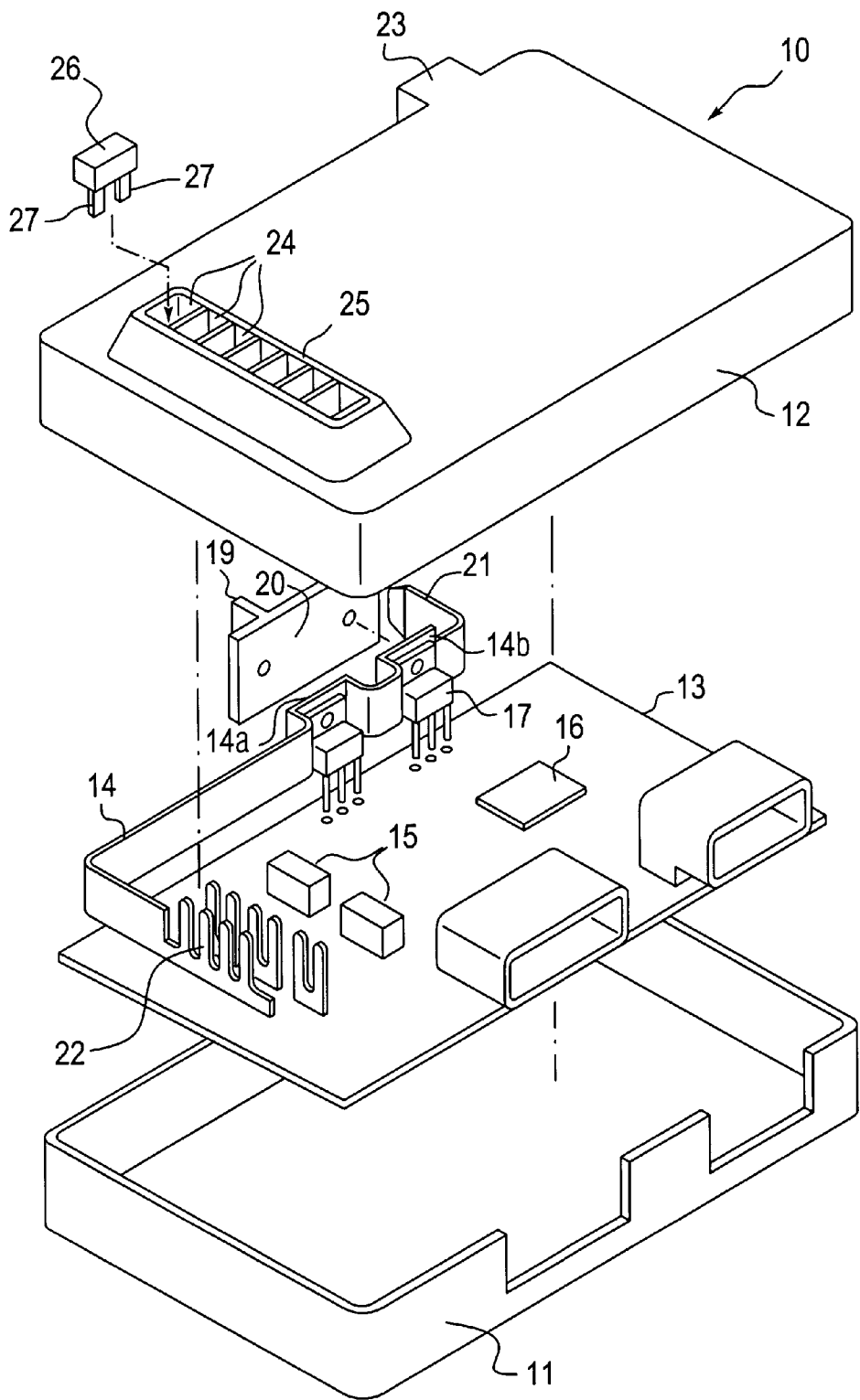
FIG. 2 is an exploded perspective view showing the switch box shown in FIG. 1.
Figure 3:
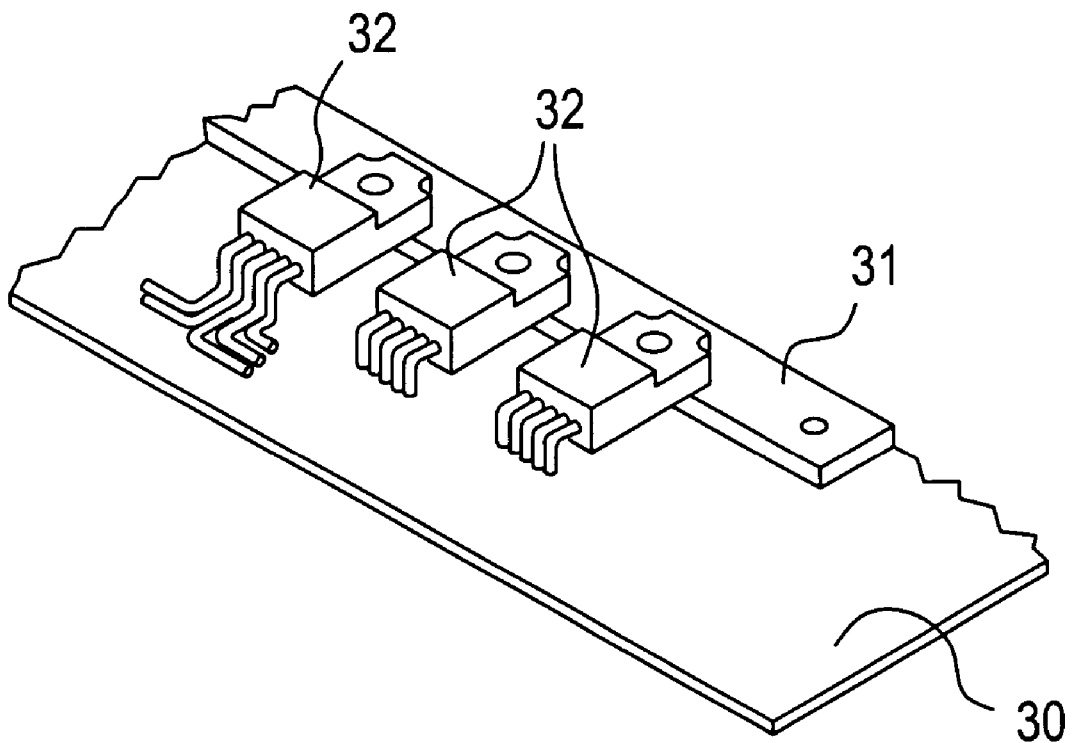
FIG. 3 is a perspective view showing main portions of a known switch box.
Figure 4:
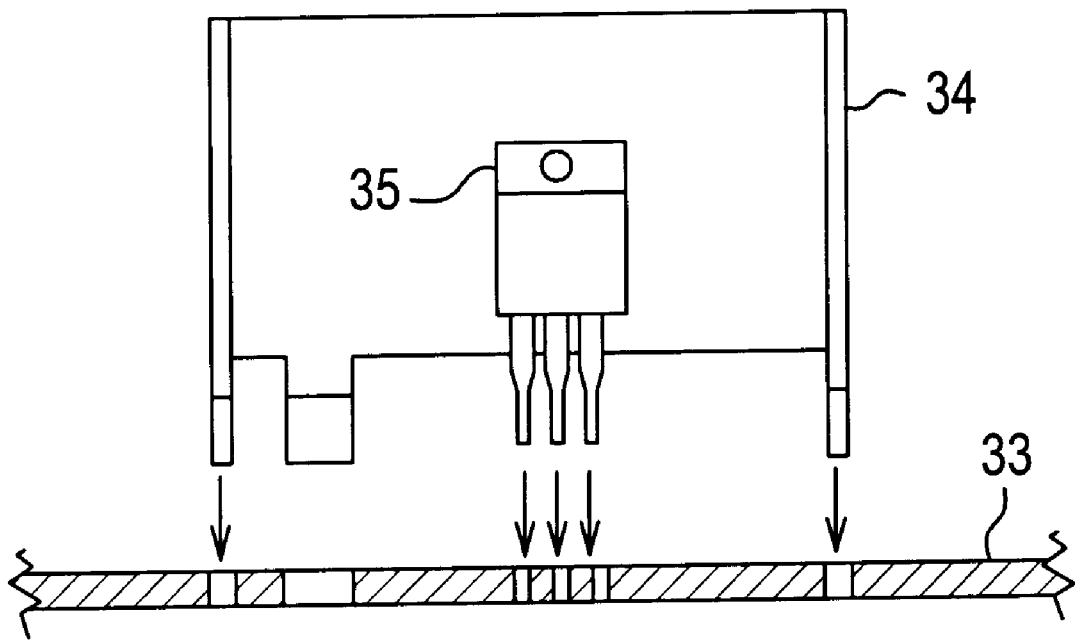
FIG. 4 is a partial sectional front view showing main portions of another known switch box.

FIGS. 1 and 2 show a switch box 10 which is an embodiment of the present invention. In the switch box 10, a plate-shaped flat substrate 13, i.e., a wiring board, is accommodated in an accommodating space formed by a lower case part 11 and an upper case part 12. An electricity distribution bus bar 14, relays 15 and a microcomputer 16 are installed on the upper face of the substrate 13.

The bus bar 14 is formed of one piece of shaped sheet metal and mounted on the substrate 13 such that the widthwise direction of the bus bar 14 is perpendicular to the upper surface of the substrate 13. Mounting portions 14a, 14b, respectively U-shaped and L-shaped in section, are formed by upstanding side surfaces of the bus bar near one end portion of the bus bar 14. Intelligent power switches 17 are fixed to the mounting portions 14a, 14b by means of screws (not shown in FIG. 2). The U-shaped mounting portion 14a provides a recess in which a switch 17 is located, so that there is contact with the switch on three sides. Similarly, the L-shaped mounting portion 14b provides contact with its switch 17 on two sides. At the side of the mounting portions 14a and 14b opposite to the switches 17, a radiation fin 19 is connected with the mounting portions 14a and 14b through an electrically insulating, heat conductive plate 20.

A power supply input tab portion 21 is formed integrally at one end of the bus bar 14, and a terminal portion 22, for mini-fuses for example, is formed integrally at the other end of the bus bar 14. A port 23 communicating with the outside projects from a side surface of the upper case part 12, at a position corresponding to the tab portion 21. The switch box 10 can be supplied with electric power by inserting a connector into the port 23 to contact and connect to the tab portion 21. An upstanding housing portion 25 having a plurality of insertion holes 24 for insertion of mini-fuses 26 is formed on the upper surface of the upper case part 12, at a location corresponding to the terminal portion 22. One terminal 27 of each of the fuses 26 can be connected with the terminal portion 22 by inserting the fuses 26 into the insertion holes 24.

As shown in FIG. 2, the switches 17 have connection pins which are located in holes in the substrate 13, thus mounting the bus bar 14 securely on the substrate. The pins make electrical contact at the underside of the substrate 13 with wiring which is provided in a conventional manner on both sides of the substrate 13, but is not shown in FIG. 2. The wiring also connects to other components mounted on the board, such as the relays 15, microcomputer 16 and fuses 26.

In the switch box 10, heat generated by the intelligent power switches 17 is dispersed through the bus bar 14 and the radiation fin 19. Thus, the construction prevents the temperature of the intelligent power switches 17 and that of the portion of the bus bar 14 near the switches 17 from becoming high.

The advantages and effects with this construction will now be described. Because the bus bar 14 is not mounted flat on the substrate 13 but is upstanding so that the widthwise direction of the strip-like bus bar 14 is perpendicular to the upper surface of the substrate 13, it is possible to greatly reduce the area of the portion of the substrate 13 on which the bus bar 14 is installed. Thus, the substrate 13, the lower case part 11, and the upper case part 12 can be compact. Further, a heat dispersal effect can be obtained by installing the intelligent power switches 17 directly on the bus bar 14.

Because the bent mounting portions 14a, 14b of the bus bar 14 at least partly embrace the switches 17, the length of the bus bar 14 is increased even though the area of the substrate 13 remains small. Thus, the heat removal from the switches 17 is increased. Further, because the switches 17 are installed in this manner on the bus bar 14, with the contact pins of the switches 17 passing through the substrate, the bus bar 14 can be stably erected on the substrate 13 and is not easily displaced.

Since the radiation fin 19 is formed in the vicinity of the intelligent power switches 17, effective heat removal can be accomplished.

Since the power supply input tab portion 21 is formed integrally with the bus bar 14 at one end thereof, it is unnecessary to form a power supply input tab on the substrate 13 separately from the bus bar 14. Thus, it is possible to reduce the number of component parts and achieve a compact substrate 13.

Since the terminal portion 22 for mini-fuses is formed integrally with the bus bar 14 at the other end thereof, it is unnecessary to form such a terminal portion on the substrate separately from the bus bar 14. Thus, it is possible to reduce the number of component parts and achieve compactness.

The embodiment shown may be altered, for example, as follows. In addition to the fuses 26, relays or the like may be connected with the terminal portion 22. The width of the bus bar 14 may be increased and the radiation fin 19 may be omitted. This construction eliminates the need for assembly of the radiation fin, improving assembly efficiency. Further, one or three or more intelligent power switches 17 may be installed on the bus bar 14.

Although the present invention has been fully described by the exemplary embodiments thereof with reference to the accompanying drawings, it is to be noted that various changes and modifications are apparent to those skilled in the art. Such changes and modifications are to be understood as included within the spirit and scope of the invention.

What is claimed is:

1. A switch box comprising:

a substrate;

an electricity distribution bus bar mounted on said substrate; and an intelligent power switch mounted on said bus bar, said bus bar being mounted to be upstanding from said substrate, said bus bar having side surfaces extending away from said substrate, and said intelligent power switch being mounted on one of said side surfaces of said bus bar;

said bus bar being shaped so as to lie against at least two sides of said intelligent power switch.

2. A switch box according to claim 1, wherein said bus bar has a power supply input contact tab as an integral part thereof.

3. A switch box according to claim 1 wherein said bus bar has a terminal portion as an integral part thereof, said terminal portion having a plurality of terminals connectible to electrical components.

4. A switch box according to claim 1, having at least one head radiation fin proximate to, an in thermally conductive connection with, a portion of said bus bar on which said intelligent power switch is mounted.

5. A vehicle having at least one switch box mounted in the vehicle, said switch box comprising:

a substrate;

an electricity distribution bus bar mounted on said substrate; and an intelligent power switch mounted on said bus bar, said bus bar being mounted to be upstanding from said substrate, said bus bar having side surfaces extending away from said substrate, and said intelligent power switch being mounted on one of said side surfaces of said bus bar;

said bus bar being shaped so as to lie against at least two sides of said intelligent power switch.

* * * * *